Patented Jan. 23, 1934

1,944,420

UNITED STATES PATENT OFFICE 1,944,420

RECOVERY OF MOLYBDENUM FROM SUBSTANCES CONTAINING MOLYBDENUM OR ITS COMPOUNDS

Johann Giesen and Ernst Peukert, Neuroessen, Germany, assignors to I. G. Farbenindustrie Aktiengesellschaft, Frankfort - on - the - Main, Germany No Drawing. Application February 6, 1932, Serial No. 591,447, and in Germany February 17, 1931

6 Claims. (Cl. 23—24)

The present invention relates to improvements in the recovery of molybdenum from substances containing molybdenum or its compounds.

It has already been proposed to recover molybdenum from substances containing the same as such or in the form of its compounds, for example, of sulphidic molybdenum compounds, in admixture with other metals or metal compounds, especially from waste catalysts containing molybdenum such as have been employed for example in the destructive hydrogenation of coals, or all kinds of hydrocarbon products such as tars, mineral oils and the like, by treatment with oxygen or gases containing the same such as air or substances supplying the same at elevated temperatures which are generally not above about 600° C. and preferably between 400° and 500° C., the molybdic acid formed by the roast being then brought into solution as ammonium molybdate by extraction with solutions of ammonia. The above mentioned mixtures of molybdenum or its compounds with other metals or compounds thereof are hereinafter referred to as mixtures comprising molybdenum and another metal. The gases used for roasting, such as oxygen and gases containing or supplying oxygen under the conditions of working are called gases comprising free oxygen. The molybdic acid is precipitated from the ammonium molybdate solution formed by the said extraction by acidification with mineral acids. The dissolving and precipitating processes are injuriously affected by the presence of other compounds, as for example compounds of zinc, magnesium, calcium, chromium, iron or other metals mixed with the molybdenum constituent for the preparation of an effective catalyst, partly in that the molybdic acid only passes partly into solution and partly in that the precipitation with mineral acids does not proceed quantitatively or that impure molybdic acid is precipitated.

In order to avoid the said objections it has been suggested to dissolve the roasted materials with an ammonium sulphide solution, if desired containing free ammonia. In this manner a practically complete dissolution only of the molybdic acid contained in the roasted material is obtained. In some cases, however, for example with catalysts containing molybdenum which have been employed in destructive hydrogenation processes in the liquid phase, it is a little difficult to bring the molybdic acid into solution quantitatively either by means of ammonia or by means of ammonium sulphide solution.

We have now found that the employment of ammonium carbonate solution effects a practically complete dissolution of the molybdic acid from masses obtained by the above mentioned roasting operation. The ammonium carbonate may be employed directly as ammonium carbonate solution or may be produced by leading carbon dioxide into solutions containing ammonia or ammonium sulphide or both, and the ammonium carbonate solution may also contain free ammonia or ammonium sulphide or both.

The total amount of ammonia present in the form of salts and in the free state is preferably in slight stoichiometrical excess over the carbon dioxide and other acids combined with ammonia. An excess of about 0.01 gram of ammonia for each gram of molybdic acid to be dissolved is usually sufficient. The carbon dioxide may be present in any amount up to the point when the solution is saturated therewith.

The molybdic acid may readily be precipitated from solutions thus prepared by means of hydrochloric acid. Similarly if the roasted materials contain zinc oxide the residue containing zinc obtained by filtering the ammonium carbonate solutions may, after roasting, readily be employed for the preparation of fresh amounts of catalysts.

The following example will further illustrate the nature of this invention but the invention is not restricted to this example.

Example

A catalyst employed in the destructive hydrogenation of brown coal low temperature carbonization tar in the liquid phase, which, in addition to molecular proportions of molybdenum, zinc and magnesium in the form of their sulphides or oxides, also contains considerable amounts of carbonaceous substances and iron, calcium and silicon compounds and other impurities depending on the nature of the hydrogenated product, is carefully roasted with gases containing oxygen at a temperature between 460° and 480° C., as is described for example in Example 1 of the specification of the application Ser. No. 478,111, filed 27th August, 1930. When the finely ground roasted material is stirred with an ammonium sulphide solution containing free ammonia in an excess even of 0.01 gram for each gram of molybdic acid and such an amount of sulphide ion as corresponds to the impurities capable of being precipitated as sulphides, the practically complete dissolution of molybdic acid is very difficult. If carbon dioxide be led in until the solution is saturated, however, or if a mixture of ammonium carbonate and ammonium sulphide solutions be employed from the start, almost 100 per cent of the molybdic acid present is dissolved.

What we claim is:—

1. In the recovery of molybdenum from a mixture comprising molybdenum and another metal, the step which comprises roasting the said mixture with a gas comprising oxygen at a temperature between 400° and 600° C. and treating the roasted mixture with a solution containing ammonium carbonate.

2. In the recovery of molybdenum from a mixture comprising molybdenum and another metal, the step which comprises roasting the said mixture with a gas comprising oxygen at a temperature between 400° and 500° C. and treating the roasted mixture with a solution containing ammonium carbonate.

3. In the recovery of molybdenum from a mixture comprising molybdenum and another metal, the step which comprises roasting the said mixture with a gas comprising oxygen at a temperature between 400° and 600° C. and treating the roasted mixture with a solution of ammonia while passing carbon dioxide into this solution.

4. In the recovery of molybdenum from a mixture comprising molybdenum and another metal, the step which comprises roasting the said mixture with a gas comprising oxygen at a temperature between 400° and 600° C. and treating the roasted mixture with a solution containing ammonium carbonate and free ammonia.

5. In the recovery of molybdenum from a mixture comprising molybdenum and another metal, the step which comprises roasting the said mixture with a gas comprising oxygen at a temperature between 400° and 600° C. and treating the roasted mixture with a solution containing ammonium carbonate and ammonium sulphide.

6. In the recovery of molybdenum from a mixture comprising molybdenum and a metal selected from the group consisting of zinc, magnesium, calcium, chromium and iron, the step which comprises roasting the mixture with a gas comprising oxygen at a temperature between 400° and 600° C. and treating the roasted mixture with a solution containing ammonium carbonate.

JOHANN GIESEN.
ERNST PEUKERT.